(12) United States Patent
Liang et al.

(10) Patent No.: US 8,211,823 B2
(45) Date of Patent: Jul. 3, 2012

(54) SELECTIVE HYDROGENATION CATALYST AND THE PREPARATION THEREOF

(75) Inventors: Shunqin Liang, Lanzhou (CN); Limin Sun, Lanzhou (CN); Longgang Lv, Lanzhou (CN); Ying Qian, Lanzhou (CN); Yundi Zheng, Lanzhou (CN); Jie Wu, Lanzhou (CN); Tinghai Wang, Lanzhou (CN); Xiaoyan Li, Lanzhou (CN)

(73) Assignee: Petrochina Company Limited, Beijing (CN)

( * ) Notice: Subject to any disclaimer, the term of this patent is extended or adjusted under 35 U.S.C. 154(b) by 0 days.

(21) Appl. No.: 12/747,865

(22) PCT Filed: Oct. 22, 2008

(86) PCT No.: PCT/CN2008/001780
§ 371 (c)(1),
(2), (4) Date: Jul. 30, 2010

(87) PCT Pub. No.: WO2009/079905
PCT Pub. Date: Jul. 2, 2009

(65) Prior Publication Data
US 2010/0331175 A1 Dec. 30, 2010

(30) Foreign Application Priority Data
Dec. 13, 2007 (CN) .......................... 2007 1 0179443

(51) Int. Cl.
*B01J 23/00* (2006.01)
*B01J 21/00* (2006.01)
*B01J 20/00* (2006.01)

(52) U.S. Cl. ........ 502/303; 502/302; 502/304; 502/327; 502/328; 502/330; 502/332; 502/333; 502/339; 502/340; 502/341; 502/344; 502/347; 502/348; 502/355; 502/415; 502/439

(58) Field of Classification Search .......... 502/302–304, 502/327, 328, 330, 332, 333, 339, 340, 341, 502/344, 347, 348, 355, 415, 439
See application file for complete search history.

(56) References Cited

U.S. PATENT DOCUMENTS

| | | | |
|---|---|---|---|
| 3,472,763 A | 10/1969 | Cosyns et al. | |
| 3,615,207 A * | 10/1971 | Lee | 423/588 |
| 3,635,841 A * | 1/1972 | Keith et al. | 502/333 |
| 3,899,444 A * | 8/1975 | Stephens | 502/241 |
| 4,000,207 A * | 12/1976 | Kaiser | 585/360 |
| 4,119,567 A * | 10/1978 | Bartsch | 502/170 |
| 4,220,559 A * | 9/1980 | Polinski | 502/250 |
| 4,237,030 A * | 12/1980 | Noguchi et al. | 502/207 |
| 4,390,456 A * | 6/1983 | Sanchez et al. | 502/8 |
| 4,410,455 A * | 10/1983 | Lambert | 502/327 |
| 4,469,816 A * | 9/1984 | Armor et al. | 502/333 |
| 4,499,205 A * | 2/1985 | Masuda | 502/303 |
| 4,835,131 A * | 5/1989 | DeJong | 502/255 |
| 4,919,902 A * | 4/1990 | Bricker et al. | 423/213.5 |
| 5,051,392 A * | 9/1991 | Mabilon et al. | 502/333 |
| 5,258,558 A | 11/1993 | Arena et al. | |
| 5,648,576 A * | 7/1997 | Nguyen Than et al. | 585/260 |
| 6,054,409 A * | 4/2000 | Nguyen Thanh et al. | 502/330 |
| 6,268,522 B1 * | 7/2001 | Hagemeyer et al. | 560/245 |
| 6,350,717 B1 * | 2/2002 | Frenzel et al. | 502/330 |
| 6,509,292 B1 * | 1/2003 | Blankenship et al. | 502/330 |
| 6,518,213 B1 * | 2/2003 | Yamamoto et al. | 502/65 |
| 6,528,453 B2 * | 3/2003 | Baker et al. | 502/325 |
| 6,534,438 B1 * | 3/2003 | Baker et al. | 502/325 |
| 6,576,586 B2 * | 6/2003 | Siqin et al. | 502/328 |
| 6,797,669 B2 * | 9/2004 | Zhang et al. | 502/339 |
| 6,806,382 B2 * | 10/2004 | Baker et al. | 560/245 |
| 6,821,922 B1 * | 11/2004 | Tacke et al. | 502/330 |
| 6,822,127 B2 * | 11/2004 | Dai et al. | 585/259 |
| 6,936,568 B2 * | 8/2005 | Blankenship et al. | 502/330 |
| 7,247,760 B2 * | 7/2007 | Cheung et al. | 585/261 |
| 7,521,393 B2 * | 4/2009 | Blankenship et al. | 502/330 |
| 7,902,104 B2 * | 3/2011 | Kalck et al. | 502/66 |
| 8,067,334 B2 * | 11/2011 | Hill et al. | 502/330 |
| 2006/0030482 A1 | 2/2006 | Ryu et al. | |
| 2006/0178262 A1 * | 8/2006 | Rokicki et al. | 502/330 |
| 2006/0217679 A1 * | 9/2006 | Hanly et al. | 604/403 |

FOREIGN PATENT DOCUMENTS

| | | |
|---|---|---|
| CN | 85100761 | 9/1986 |
| CN | 1218822 | 6/1999 |
| CN | 1443829 | 9/2003 |
| CN | 1175931 | 11/2004 |
| CN | 1623655 | 6/2005 |
| CN | 1958155 | 5/2007 |
| CN | 1995290 | 7/2007 |
| CN | 101037613 | 9/2007 |
| JP | 8229392 | 9/1996 |
| KR | 20020061434 | 7/2002 |

OTHER PUBLICATIONS

International Search Report for PCT/CN2008/001780 dated Feb. 5, 2009.

* cited by examiner

*Primary Examiner* — Cam N. Nguyen
(74) *Attorney, Agent, or Firm* — Knobbe, Martens, Olson & Bear, LLP

(57) ABSTRACT

A selective hydrogenation catalyst, with alumina as carrier, and palladium as active component that distributed on the surface of the carrier in an egg-shell form, characterized in that: provided that the catalyst is weighed 100%, it comprises 0.2-0.5 wt % active component Pd, 2-8 wt % aids lanthanum and/or cerium, and 2-8 wt % alkaline earth metal. The specific surface area of the catalyst is 70-150 m2/g, the pore volume is 0.3-0.6 ml/g, and the crystal form of the carrier may be θ form or θ, α mixed form mainly composed of θ form. The catalyst is suitable for the selective hydrogenation of medium or low distillate oil, especially for the first stage selective hydrogenation of pyrolysis gasoline. The catalyst has good hydrogenation performance, and can keep good hydrogenation activity and stability especially under the condition that the feed contains a small quantity of water, and the content of colloid, arsenic, and diolefin is higher.

11 Claims, No Drawings

SELECTIVE HYDROGENATION CATALYST AND THE PREPARATION THEREOF

This application is U.S. National Phase of International Application No. PCT/CN2008/001780, filed Oct. 22, 2008, designating the United States, and published in Chinese as WO 2009/079905 on Jul. 2, 2009, which claims priority to Chinese Patent Application No. 200710179443.1, filed Dec. 13, 2007.

FIELD OF THE INVENTION

The present invention relates to a selective hydrogenation catalyst and the preparation thereof. The catalyst is suitable for the selective hydrogenation of medium or low distillate oil, especially for the first stage selective hydrogenation of pyrolysis gasoline distillate.

BACKGROUND OF THE INVENTION

Pyrolysis gasoline is a byproduct $C_5$-200° C. during the preparation of ethylene, the yield of which is above 50% to 80% of ethylene production capacity, wherein the amount of aromatics is more than 50%, making the pyrolysis gasoline an important source for aromatics. The pyrolysis gasoline also comprises highly unsaturated hydrocarbons such as diolefin, styrene and the like that are convertible to corresponding monoolefin via selective hydrogenation and act as the starting material for extracting aromatics. Recently, ethylene industry has been largely developed and the ethylene production capacity is improved yearly, leading to substantial increasing of the yield of pyrolysis gasoline that is an important byproduct of ethylene. The hydrogenation technique focusing on the hydrogenation catalyst of pyrolysis gasoline is an important branch in the field of hydrogenation and plays a critical role in the post-treatment of preparation of ethylene by steam cracking.

Currently in industry, the catalyst for the first stage selective hydrogenation of pyrolysis gasoline mainly comprises platinum and palladium catalysts, with the majority being palladium-based catalysts. Palladium-based catalysts are advantageous to have low start temperature, high hydrogenation activity, large feed capacity, long lifetime and so on. However, in part of the feed for hydrogenation apparatus of pyrolysis gasoline, the amount of water and arsenic is in excess, and the distillate is too heavy, and the hydrogenation load is too large, leading to the low stability and short lifetime of the current catalysts in industry process.

CN 200410061031 reports a palladium-alumina catalyst, and the preparation thereof. The application relates to using $Al_2O_3$ calcinated at elevated temperature and precoated with proper amount of alkaline earth metal oxide as a carrier, and impregnating the carrier with 0.15% to 0.24% of palladium to produce the catalyst. CN 1175931C reports supported palladium-alumina catalysts for hydrogen peroxide production by anthraquinone route and the preparation thereof. The application relates to using $Al_2O_3$ calcinated at 900 to 1000° C. and precoated with proper amount of rare earth oxide as a carrier, and impregnating the carrier with 0.15% to 0.25% of palladium to produce the catalyst. CN 85100761A discloses a fiber carrier catalyst for selective hydrogenation of diolefin which is the distillate of pyrolysis gasoline, characterized in the use of $\eta$-$Al_2O_3$ porous fibrous carrier having a specific surface area of 20 to 150 $m^2/g$ and a pore volume of 0.1 to 0.3 ml/g. The catalyst has a high initial activity, but the pore volume is too small. When the content of colloid, water and arsenic in the feed for pyrolysis gasoline hydrogenation apparatus is in excess, the pores on the catalyst are readily coked and blocked, which influences the hydrogenation stability of the catalyst.

An excellent selective hydrogenation catalyst should have high hydrogenation activity and good selectivity, and more importantly, it should have good stability. That is, the catalyst should be water-resistant and colloid-resistant, so as to extend the lifetime of the catalyst.

SUMMARY OF THE INVENTION

The present invention is directed to provide a new selective hydrogenation catalyst especially suitable for pyrolysis gasoline, and the preparation thereof. The present catalyst has good water-resistant and colloid-resistant property, and also has ability against high load and oil change as well as higher hydrogenation stability.

The selective hydrogenation catalyst according to the present invention, with alumina as carrier, and metal palladium as active component that supported on the surface of the carrier in an egg-shell form, characterized in that based on the total weight of the catalyst, it comprises:

0.2 to 0.5 wt % Pd as active component,
2 to 8 wt % lanthanum and/or cerium as aids, and
2 to 8 wt % alkaline earth metal, wherein said catalyst has a shell thickness of 0.07 to 0.15 mm, a specific surface area of 70 to 150 $m^2/g$ and a pore volume of 0.3 to 0.6 ml/g, and the crystal form of the carrier may be $\theta$ form or $\theta$, $\alpha$ mixed form mainly composed of $\theta$ form. The catalyst is useful in diolefin selective hydrogenation of medium or low distillate oil, in particular, in the first-stage selective hydrogenation process of pyrolysis gasoline distillate.

The alumina carrier in the present invention may be prepared by conventional method. For example, during the preparation of carrier, the alumina powder and water are kneaded and extruded, then dried at 40 to 120° C., and calcinated at 300 to 600° C. for 4 to 6 hours.

The catalyst according to the present invention is prepared by the most common impregnation process, that is, the addition of active component is accomplished by impregnation process. The present invention also provides the best preparation process for the present catalyst: alkaline earth metal, lanthanum and/or cerium are preferably added prior to palladium, especially prior to the formation of alumina in $\theta$ form or in $\theta$, $\alpha$ mixed form, leading to better improvement of acidity, activity and stability of the carrier.

The present invention also provides a specific preparation process for the present catalyst: the soluble salts of alkaline earth metal, lanthanum and/or cerium nitrates are dissolved in water to form a solution, and then the carrier is impregnated with the said solution, dried at 40 to 120° C., and calcinated at 900 to 1100° C. for 4 to 6 hours to obtain alumina carrier in $\theta$ form or in $\theta$,$\alpha$ mixed form comprising alkaline earth metal elements, lanthanum and/or cerium. The impregnation loading of metal palladium is the same as the impregnation technique of common shell catalyst, that is, the alumina carrier in $\theta$ form or in $\theta$,$\alpha$ mixed form is first pre-impregnated with a liquid miscible with a salt solution containing noble metal palladium, and then the pre-impregnated alumina carrier in $\theta$ form or in $\theta$,$\alpha$ mixed form is impregnated with the salt solution containing noble metal palladium. Thereafter the resultant impregnated alumina carrier is washed, dried and calcinated at 350 to 500° C. for 2 to 4 hours to obtain the catalyst product.

The most common liquid which is used for pre-impregnating the alumina carrier in θ form or in θ,α mixed form and is miscible with a salt solution containing noble metal palladium is deionized water.

The catalyst according to the present invention may be prepared by another process: soluble salts of alkaline earth metal, lanthanum and/or cerium are added into water to dissolve, and then alumina powder is added into the solution, kneaded followed by extrusion, dried at 40 to 120° C., and calcinate at 900 to 1100° C. for 4 to 6 hours. Then the carrier is impregnated with palladium. The impregnation of palladium is accomplished using general impregnation methods, as described above.

It is not limited that the catalyst according to the present invention is obtained by the preparation process described herein. The catalyst product according to the present invention may be used after reduction with hydrogen in the reactor.

Pd as active component in the catalyst is in the amount of 0.2-0.5 wt %, preferably, 0.2-0.4 wt %. Too low amount of Pd will lead to the hydrogenation activity of catalyst too low. Contrarily, too high amount of Pd will lead to the initial activity of catalyst too high.

The addition of lanthanum and/or cerium into the catalyst according to the present invention may inhibit the growth of $Al_2O_3$ crystalline during the calcination at elevated temperature, increase the dispersion of Pd, increase the surface basicity of the carrier, and improve the hydrogenation activity and stability of the catalyst. The amount of lanthanum and/or cerium in the catalyst is 2 to 8 wt %, preferably 2 to 6 wt %. The effect of lanthanum and/or cerium is not significant when their content is too low, and the activity of the catalyst would be influenced when their content is too high. The rare earth metal may be one or two of lanthanum and cerium, preferably is cerium.

In one aspect, after the addition of alkaline earth metal into the catalyst according to the present invention, the surface acidity of the catalyst may be regulated by calcination at elevated temperature, and the colloid-resistance property of the catalyst during the hydrogenation may be improved. In another aspect, the incorporated alkaline earth metal together with lanthanum and/or cerium may have a synergy effect with alumina, prevent the loss of the specific surface area of the alumina carrier, and improve the thermal stability and chemical stability of the alumina carrier. The content of the alkaline earth metal in the catalyst is 2 to 8 wt %, preferably 3 to 6 wt %. The effect of the alkaline earth metal is not significant when its content is too low, and the activity of the catalyst would be influenced when its content is too high. The alkaline earth metal may be one or more of Mg, Ba, Sr and the like, preferably is Mg.

The catalyst according to the present invention may comprise other components such as one or more of Ag, K and the like, in addition to the required components, the content of the other components being generally 0 to 0.2 wt %, preferably 0.4 to 1.7 wt %.

The carrier of the catalyst according to the present invention is alumina in θ form or in θ,α mixed form characterized in proper specific surface area and pore distribution, good activity and stability, which is better than alumina carriers in other crystallization form. When the alumina in θ,α mixed form mainly composed of θ form is used, it is preferable to have less than 15% of α form and 80 to 120 m$^2$/g of specific surface area.

The $Al_2O_3$ powder used in the catalyst according to the present invention may be commercial available alumina powder, such as those obtained by nitric acid method or carbon dioxide method. The shape of the alumina carrier is not particularly limited in the present invention, it may be in sphere or extruded strip form.

DETAILED DESCRIPTION OF THE INVENTION

Source of starting materials and analysis method:
Alumina powder: available from Shandong Taiguang Company Limited
Alumina carrier: extruded strip Example 1

180 ml water was added to 300 g alumina powder, which was then kneaded and extruded, dried in air at 120° C. and calcinated at 560° C. for 4 hours. Then 76.5 g magnesium nitrate and 28.7 g lanthanum nitrate were dissolved in water and impregnated onto the carrier, dried in air at 120° C. and calcinated at 1020° C. for 4 hours to produce $Al_2O_3$ carrier.

5.25 g palladium chloride powder having a palladium content of not less than 59% was weighed and added into 200 ml water, followed by the addition of hydrochloric acid. After dissolution, the solution was diluted to 1.2 L with deionized water. The pH value was adjusted depending on the thickness of the shell needed. 1.0 kg carrier product was weighed, and deionized water was added to impregnate the carrier. The water was filtered off. The prepared palladium chloride solution was poured onto the carrier, and the mixture was heated to boil under stirring. After 20 minutes, the solution was filtered, dried at 120° C. in air and calcinated at 480° C. for 4 hours, thereby obtaining the catalyst.

Comparative Example 1

180 ml water was added to 300 g alumina powder, which was then kneaded and extruded, dried at 120° C. in air and calcinated at 540° C. for 4 hours. Then 76.5 g magnesium nitrate was dissolved in water and impregnated onto the carrier, dried at 120° C. in air and calcinated at 1020° C. for 4 hours to produce $Al_2O_3$ carrier.

The preparation of the catalyst is similar to that of Example 1.

Comparative Example 2

180 ml water was added to 300 g alumina powder, which was then kneaded and extruded, dried at 120° C. in air and calcinated at 540° C. for 4 hours. Then 28.7 g lanthanum nitrate was dissolved in water and impregnated onto the carrier, dried at 120° C. in air and calcinated at 1020° C. for 4 hours to produce $Al_2O_3$ carrier.

The preparation of the catalyst is similar to that of Example 1.

Comparative Example 3

180 ml water was added to 300 g alumina powder, which was then kneaded and extruded, dried at 120° C. in air and calcinated at 540° C. for 4 hours. Then 45.2 g cerium nitrate was dissolved in water and impregnated onto the carrier, dried at 120° C. in air and calcinated at 1020° C. for 4 hours to produce $Al_2O_3$ carrier.

The preparation of the catalyst is similar to that of Example 1.

Example 2

180 ml water was added to 300 g alumina powder, which was then kneaded and extruded, dried at 120° C. in air and calcinated at 540° C. for 4 hours. Then 100.7 g magnesium nitrate and 34.5 g cerium nitrate were dissolved in water and impregnated onto the carrier, dried at 120° C. in air and calcinated at 1030° C. for 4 hours to produce $Al_2O_3$ carrier in θ form.

5.6 g palladium chloride powder having a palladium content of not less than 59% was weighed and added into 200 ml water, followed by the addition of hydrochloric acid. After dissolution, the solution was diluted to 1.2 L with deionized water. The pH value was adjusted depending on the thickness of the shell needed. 1.0 kg carrier product was weighed, and deionized water was added to impregnate the carrier. The water was filtered off. The prepared palladium chloride solution was poured onto the carrier, and the mixture was heated to boil under stirring. After 20 minutes, the solution was filtered, dried at 120° C. in air and calcinated at 450° C. for 4 hours to produce the catalyst.

Comparative Example 4

180 ml water was added to 300 g alumina powder, which was then kneaded and extruded, dried at 120° C. in air and calcinated at 560° C. for 4 hours. Then 69.7 g magnesium nitrate and 34.5 g cerium nitrate were dissolved in water and impregnated onto the carrier, dried at 120° C. in air and calcinated at 850° C. for 4 hours to produce $Al_2O_3$ carrier in δ form.

The preparation of the catalyst is similar to that of Example 2.

Example 3

102.5 g magnesium nitrate, 20.1 g cerium nitrate and 19.4 g lanthanum nitrate were dissolved in water and added into 300 g alumina powder. The mixture was kneaded and extruded, dried at 120° C. in air and calcinated at 1050° C. for 4 hours to produce $Al_2O_3$ carrier in θ form.

5.07 g palladium chloride powder having a palladium content of not less than 59% was weighed and added into 200 ml water, followed by the addition of hydrochloric acid. After dissolution, the solution was diluted to 1.1 L with deionized water. The pH value was adjusted depending on the thickness of the shell needed. 1.0 kg carrier product was weighed, and deionized water was added to impregnate the carrier. The water was filtered off. The prepared palladium chloride solution was poured onto the carrier, and the mixture was heated to boil under stirring. After 20 minutes, the solution was filtered, dried at 120° C. in air and calcinated at 460° C. for 4 hours to produce the catalyst.

Example 4

Selective hydrogenation catalyst carrier for medium or low distillate supplied by Shandong Taiguang Company Limited is used and calcinated at 500° C. for 4 hours. Then 162.9 g magnesium nitrate, 38.6 g cerium nitrate and 1.8 g silver nitrate were dissolved in water and impregnated onto the carrier, dried at 120° C. in air and calcinated at 1050° C. for 4 hours to produce $Al_2O_3$ carrier in θ form.

5.95 g palladium chloride powder having a palladium content of not less than 59% was weighed and added into 200 ml water, followed by the addition of hydrochloric acid. After dissolution, the solution was diluted to 1.2 L with deionized water. The pH value was adjusted depending on the thickness of the shell needed. 1.0 kg carrier product was weighed, and deionized water was added to impregnate the carrier. The water was filtered off. The prepared palladium chloride solution was poured onto the carrier, and the mixture was heated to boil under stirring. After 20 minutes, the solution was filtered, dried at 120° C. in air and calcinated at 460° C. for 4 hours to produce the catalyst.

Example 5

180 ml water was added to 300 g alumina powder, which was then kneaded and extruded, dried at 120° C. in air and calcinated at 560° C. for 4 hours. Then 13.1 g barium nitrate, 9.1 g strontium nitrate and 34.5 g cerium nitrate were dissolved in water and impregnated onto the carrier, dried at 120° C. in air and calcinated at 1000° C. for 4 hours to produce $Al_2O_3$ carrier in θ form.

4.72 g palladium chloride powder having a palladium content of not less than 59% was weighed and added into 200 ml water, followed by the addition of hydrochloric acid. After dissolution, the solution was diluted to 580 ml with deionized water. The pH value was adjusted depending on the thickness of the shell needed. 1.0 kg carrier product was weighed, and deionized water was added to impregnate the carrier. The water was filtered off. The prepared palladium chloride solution was poured onto the carrier, and the mixture was heated to boil under stirring. After 20 minutes, the solution was filtered, dried at 120° C. in air and calcinated at 470° C. for 4 hours to produce the catalyst.

Example 6

180 ml water was added to 300 g alumina powder, which was then kneaded and extruded, dried at 120° C. in air and calcinated at 560° C. for 4 hours. Then 30.5 g strontium nitrate and 45.52 g lanthanum nitrate were dissolved in water and impregnated onto the carrier, dried at 120° C. in air and calcinated at 1050° C. for 4 hours to produce $Al_2O_3$ carrier in θ,α mixed form.

5.78 g palladium chloride powder having a palladium content of not less than 59% was weighed and added into 200 ml water, followed by the addition of hydrochloric acid. After dissolution, the solution was diluted to 590 ml with deionized water. The pH value was adjusted depending on the thickness of the shell needed. 1.0 kg carrier product was weighed, impregnated with the prepared palladium chloride solution, dried at 120° C. in air and calcinated at 450° C. for 4 hours to produce the catalyst.

Comparative Example 5

180 ml water was added to 300 g alumina powder, which was then kneaded and extruded, dried at 120° C. in air and calcinated at 560° C. for 4 hours. Then 7.6 g potassium nitrate and 2.1 g silver nitrate were dissolved in water and impregnated onto the carrier, dried at 120° C. in air and calcinated at 980° C. for 4 hours to produce $Al_2O_3$ carrier in θ form.

The preparation of the catalyst is similar to that of Example 6.

INDUSTRY APPLICABILITY

Oil for evaluation: available from Lanzhou Chemical Company

TABLE 1

| | | | | | | | | |
|---|---|---|---|---|---|---|---|---|
| Properties of the hydrogenation feed oil ($C_5$-$C_9$) | | | | | | | | |
| Color | Iodine value × $10^{-2}$ (g/g) | Diolefin × $10^{-2}$ (g/g) | Distillation range (° C.) | Sulfur content (ppm) | Colloid × $10^{-2}$ (mg/ml) | Water content (ppm) | Density (g/ml) | Arsenic content (ppb) |
| Yellow | 171.3 | 33.7 | 45-205 | 96 | 13.0 | 650 | 0.815 | 36 |

Apparatus for evaluation: 100 ml adiabatic bed hydrogenation apparatus
Analysis Method
specific surface area: BET method
Pore volume: BET method
Diolefin: Diolefin value of oil is determined by malic anhydride method and is expressed as g iodine/100 g oil
Iodine value: Iodine value of oil is determined by iodine chloride method and is expressed as g iodine/100 g oil
The physical properties of the catalysts of examples and comparative examples are shown in Table 2.

$C_5$-$C_9$ distillate of pyrolysis oil is used as the feed, and the property thereof is shown in Table 1. The catalysts of Example 1-6 and Comparative example 1-5 were evaluated. The evaluation was carried out on 100 ml adiabatic bed hydrogenation apparatus. The catalysts were first reduced under hydrogen at 110° C. for 10 hours. After cooling to 40° C., the feed oil was fed. The reaction condition: reaction pressure 2.8 MPa, inlet temperature 40° C., fresh feed oil rate 3.5 $h^{-1}$, volume ratio of hydrogen to oil 200:1 (based on fresh oil). The evaluation was carried out for 200 hours. And the iodine value and diolefin of the products were analyzed every 6 hours. The average data of the iodine value and diolefin of the product for each catalyst during the 200-hour evaluation are shown in Table 3.

TABLE 2

Physical properties of the catalyst samples of Examples 1-6 and Comparative examples 1-5

| | Ex. 1 | Comp. example 1 | Comp. example 2 | Comp. example 3 | Ex. 2 | Comp. example 4 | Ex. 3 | Ex. 4 | Ex. 5 | Ex. 6 | Comp. example 5 |
|---|---|---|---|---|---|---|---|---|---|---|---|
| Crystallization form of the carrier | θ | θ | θ, α mixed form α < 5% | θ | θ | δ | θ | θ | θ | θ, α mixed form α < 10% | θ |
| Dimension | | | | | Φ2.8-3.0 × 3-8 trifolium-shaped | | | | | | |
| Specific surface area ($m^2$/g) | 93 | 90 | 92 | 95 | 96 | 103 | 105 | 94 | 102 | 91 | 104 |
| Pore volume (ml/g) | 0.47 | 0.46 | 0.47 | 0.47 | 0.46 | 0.49 | 0.45 | 0.47 | 0.44 | 0.48 | 0.46 |
| Pd content (%) | 0.30 | 0.30 | 0.30 | 0.30 | 0.32 | 0.32 | 0.29 | 0.34 | 0.27 | 0.33 | 0.30 |
| Shell thickness (mm) | 0.08 | 0.10 | 0.09 | 0.09 | 0.08 | 0.15 | 0.07 | 0.11 | 0.07 | 0.10 | 0.13 |
| K content (%) | / | / | / | / | / | / | / | / | / | / | 1.3 |
| Mg content (%) | 3.1 | 3.2 | / | / | 3.9 | 2.7 | 3.9 | 6.1 | / | / | / |
| Ba content (%) | / | / | / | / | / | / | / | / | 2.9 | / | / |
| Sr content (%) | / | / | / | / | / | / | / | / | 1.5 | 5.1 | / |
| La content (%) | 3.9 | / | 4.2 | / | / | / | 2.5 | / | / | 5.9 | / |
| Ce content (%) | / | / | / | 6.4 | 4.6 | 4.6 | 2.6 | 4.9 | 4.7 | / | / |
| Ag content (%) | / | / | / | / | / | / | / | 0.45 | / | / | 0.6 |

TABLE 3

The average data of 200-hour evaluation for catalysts of examples and comparative examples

| | | Ex. 1 | Comp. example 1 | Comp. example 2 | Comp. example 3 | Ex. 2 | Comp. example 4 | Ex. 3 | Ex. 4 | Ex. 5 | Ex. 6 | Comp. example 5 |
|---|---|---|---|---|---|---|---|---|---|---|---|---|
| Product oil | Diolefin value g iodine/100 g oil | 1.01 | 1.18 | 1.22 | 1.82 | 1.02 | 0.98 | 1.05 | 2.01 | 1.34 | 1.15 | 1.87 |
| | Iodine value g iodine/100 g oil | 42.6 | 44.2 | 45.3 | 45.3 | 41.5 | 41.2 | 43.7 | 42.8 | 44.8 | 45.1 | 45.6 |
| After reacting for 200 hours, the colloid content on the catalyst % | | 7.5 | 7.8 | 9.8 | 9.9 | 7.2 | 12.6 | 7.4 | 8.8 | 7.5 | 7.9 | 10.1 |

The catalyst sample of Example 2 was performed 1000 hour long period evaluation. The evaluation was carried out on 100 ml adiabatic bed hydrogenation apparatus. The catalysts were first reduced under hydrogen at 106° C. for 10 hours. After cooling to 45° C., the feed oil was fed. The reaction condition: reaction pressure 2.8 MPa, inlet temperature ~45° C., fresh feed oil rate 3.5 $h^{-1}$, volume ratio of hydrogen to oil 200:1 (based on fresh oil). The property of the hydrogenation feed oil ($C_5$-$C_9$) is shown in Table 1. The iodine value and diolefin of the product were evaluated for each 12 hours. The average analysis data in each 200 hours were obtained and the evaluation results are shown in Table 4. During the 1000-hour operation time of feeding the feed, the iodine value and diolefin value of the hydrogenation product maintained at low level, which indicates that the catalyst of Example 2 is suitable for the relatively worse hydrogenation feed having a diolefin value of 33.7 g iodine/100 g oil, iodine value of 171 g iodine/100 g oil, water amount of 650 ppm, arsenic amount of 36 ppb and colloid amount of 13 mg/100 ml. The catalyst has an ability against impurities such as colloid, water, arsenic and the like, and a good stability as well as good hydrogenation activity.

TABLE 4

1000-hour evaluation data for catalysts of Example 2 and Comparative Example 4

| | Hydrogenation product index | | | |
|---|---|---|---|---|
| | Catalyst of Example 2 | | Catalyst of Comparative example 4 | |
| Cumulative operation time (h) | Diolefin $10^{-2}$ (g/g) | Iodine value × $10^{-2}$ (g/g) | Diolefin $10^{-2}$ (g/g) | Iodine value × $10^{-2}$ (g/g) |
| 200 | 0.8 | 42.5 | 0.8 | 40.9 |
| 400 | 1.0 | 44.8 | 1.1 | 45.8 |
| 600 | 1.2 | 48.6 | 1.8 | 47.3 |
| 800 | 1.4 | 50.2 | 2.5 | 48.1 |
| 1000 | 1.6 | 52.7 | 2.8 | 50.2 |

The hydrogenation catalyst according to the present invention has good hydrogenation performance, especially under the condition that the hydrogenation feed contains a small quantity of water and colloid, the catalyst still has good hydrogenation activity and stability. The catalyst is suitable for the selective hydrogenation of medium or low distillate oil, especially for the first stage selective hydrogenation of pyrolysis gasoline.

What is claimed is:

1. A selective hydrogenation catalyst comprising alumina as a carrier and palladium (Pd) as an active component that is distributed on the surface of the carrier in an egg-shell form, wherein based on the total weight of the catalyst, it comprises:
   0.2 to 0.5 wt % Pd as an active component,
   2 to 8 wt % lanthanum and/or cerium as aids,
   2 to 8 wt % alkaline earth metal, and
   0 to 2.0 wt % Ag and/or K,
wherein said catalyst has a shell thickness of 0.07 to 0.15 mm, a specific surface area of 70 to 150 $m^2$/g, a pore volume of 0.3 to 0.6 ml/g; and the crystal form of said carrier is θ form or θ, α mixed form mainly composed of θ form.

2. The selective hydrogenation catalyst according to claim 1, wherein the alkaline earth metal is one or more selected from the group consisting of calcium, magnesium, strontium and barium.

3. The selective hydrogenation catalyst according to claim 1, wherein the alkaline earth metal in the catalyst is in the amount of 3 to 6 wt %.

4. The selective hydrogenation catalyst according to claim 1, wherein the catalyst has a specific surface area of 80 to 120 $m^2$/g.

5. The selective hydrogenation catalyst according to claim 1, wherein the Pd in the catalyst is in the amount of 0.2 to 0.4 wt %.

6. The selective hydrogenation catalyst according to claim 1, wherein the lanthanum and/or cerium in the catalyst is in the amount of 2 to 6 wt %.

7. The selective hydrogenation catalyst according to claim 1, wherein in the case where the alumina carrier is in θ, α mixed form mainly composed of θ form, the α form is less than 15%.

8. The selective hydrogenation catalyst according to claim 1, wherein the added amount of Ag and/or K in the catalyst is 0.4 to 1.7 wt %.

9. A method for preparing the selective hydrogenation catalyst according to claim 1 comprising:
   adding the alkaline earth metal, lanthanum and/or cerium to the carrier so as to provide the carrier comprising the alkaline earth metal, lanthanum and/or cerium; and
   adding palladium to the carrier comprising the alkaline earth metal, lanthanum and/or cerium;
   wherein said adding palladium comprises:
   impregnating the carrier comprising the alkaline earth metal, lanthanum and/or cerium with a solution comprising palladium.

10. A method for preparing the selective hydrogenation catalyst according to claim 1 comprising:

adding alkaline earth metal, lanthanum and/or cerium to the carrier, wherein the carrier is prior to the formation of alumina in θ form or θ, α mixed form.

11. A method for preparing the selective hydrogenation catalyst according to claim 1 comprising:
dissolving soluble salts of alkaline earth metal element, lanthanum and/or cerium in water to form a solution;
impregnating the carrier with said solution;
drying the impregnated carrier at 40 to 120° C.;
calcinating the dried carrier at 900 to 1100° C. for 4 to 6 hours, thereby forming the carrier in θ form or θ, α mixed form comprising alkaline earth metal element, lanthanum and/or cerium;

pre-impregnating said carrier in θ form or in θ, α mixed form with a liquid miscible with a salt solution containing noble metal palladium;
then impregnating the pre-impregnated carrier in θ form or in θ, α mixed form with the salt solution containing noble metal palladium;
washing and drying the resultant impregnated carrier in θ form or in θ, α mixed form; and
calcinating the washed and dried carrier at 350 to 500° C. for 2 to 4 hours, thereby obtaining the catalyst.

\* \* \* \* \*